United States Patent Office 3,301,683
Patented Jan. 31, 1967

---

3,301,683
ACIDIC FRUIT AND VEGETABLE FOOD AND METHOD OF COLORING EMPLOYING BENZOPYRYLIUM COMPOUNDS
Leonard Jurd, Berkeley, Calif., assignor to the United States of America as represented by the Secretary of Agriculture
No Drawing. Filed Feb. 27, 1963, Ser. No. 261,546
8 Claims. (Cl. 99—103)

A non-exclusive, irrevocable, royalty-free license in the invention herein described, throughout the world for all purposes of the United States Government, with the power to grant sublicenses for such purposes, is hereby granted to the Government of the United States of America.

This invention relates in general to the art of imparting color to food products. More particularly, the invention is concerned with the use of certain benzopyrylium compounds for such purpose. The objects of the invention include the provision of novel methods and compositions of matter wherein these benzopyrylium compounds are involved. Further objects and advantages of the invention will be obvious from the following description wherein parts and percentages are by weight unless otherwise specified. The expression "p.p.m." used herein means parts per million.

It is well known in the field of biochemistry that the characteristic color of many flowers and fruits is due to their content of natural pigments called "anthocyanins." The characteristic color of cherries, cranberries, strawberries, raspberries, and grapes, for example, is primarily due to this natural coloring principles. The basic structure of the anthocyanins is the flavylium (or 2-phenyl benzopyrylium) nucleus:

(I)

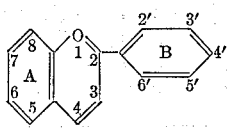

with variation as to the substituents on the various available positions on the A and B rings. The oxygen atom (at position 1) is in an oxonium configuration so that ordinarily the compounds are isolated in the form of salts with strong acids such as hydrochloric acid.

Most anthocyanins contain a glycoside group at position 3 with several hydroxy groups on the other positions, often at positions 5, 7, and 4'. A typical anthocyanin is oxycoccicyanin chloride which has been isolated from cranberries. Its structure is:

(II)

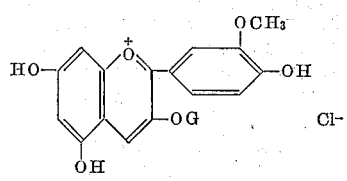

where G represents a β-glucosyl radical.

The anthocyanins may be prepared in aglycone form and these are referred to as anthocyanidins. The aglycone form of oxycoccicyanin chloride, for example, is peonidin chloride. The structure of this compound is as represented in Formula II above, but wherein G is hydrogen.

It is well understood in the food processing industry that the natural anthocyanin pigments are not able. Thus, when various food products such as berries, cherries, grapes, etc. are processed and stored their natural color diminishes or even disappears completely. A typical example in this regard is the gradual change in color from bright red to brownish-red or even brown, observed with frozen strawberries. Another example is the faded apperance of canned cherries. Many jams, jellies, and preserves display muddy brownish colors in contrast to the vivid color of the original fruit. In preparing maraschino cherries, it is conventional to brine the fresh cherries in a solution containing sulphites or bisulphites. Contact of this brine with the fruit causes a complete loss of color so that the fruit has a straw-yellow appearance, requiring addition of a food dye when the product is put up for sale.

In accordance with the invention, foods are colored with compounds which contain the benzopyrylium nucleus of the natural anthocyanins but which differ in two significant aspects from the natural pigments. These points of distinction are as follows:

(1) In the compounds of the invention, the 3-position is unsubstituted or is provided particular substituents as designated below. In either case, such structure renders the compounds of the invention stable. My researches have shown that the instability of the natural pigments is primarily due to the substitutent on the 3-position. In the glycosidic form of the natural pigments (the anthocyanins themselves), this position is occupied by a sugar residue. In the aglycone form of the natural pigments (the anthocyanidins), this position is occupied by a hydroxy group. Either a sugar residue or a hydroxy group at the 3-position, I have determined, makes for instability. It has been found, moreover, that if the glycoside residue or hydroxy group at position 3 is replaced by any one of several other types of radicals, the problem is obviated in that the compounds are stable and retain their original color despite long exposure to adverse conditions such as contact with ascorbic acid, enzymes, light, heat, etc. In particular, I have found that stability is imparted to the pigments when the 3-position is occupied by a lower alkyl radical, a lower alkoxy radical, a phenyl radical, a phenoxy radical, or when the 3-position is unsubstituted. In the preferred modification of the invention, the 3-position is unsubstituted because such compounds can be prepared from more readily available and lower priced intermediates.

(2) The compounds of the invention contain a styrene nucleus attached to the benzopyrylium at position 2. This styryl group has the advantage that the compounds exhibit deeper hues than is possible with the flavylium-type structure wherein a phenyl nucleus is attached at position 2. In particular, the 2-styryl benzopyrylium structure makes it possible to attain bright red and blue-red shades with as few as two hydroxy groups.

The compounds of the invention may be described generically as benzopyrylium salts of the formula:

(III)

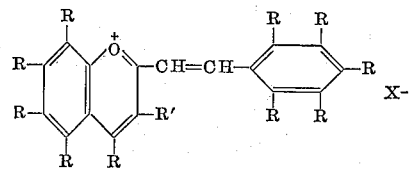

wherein each R represents a radical selected from the group consisting of hydrogen, hydroxyl, and lower alkoxy, wherein R' represents a radical selected from the group consisting of hydrogen, lower alkyl, phenyl, lower alkoxy, and phenoxy, and wherein X is an anion.

The preferred category of compounds are those wherein R' is hydrogen and X is the chloride ion.

The compounds of the invention are readily prepared by a variation of the method of Buck and Heilbron (Jour. Chem. Soc. vol. 121, pp. 1198–1212, 1922) which involves condensation of (1) ortho-hydroxybenzaldehyde or its substituted derivatives with (2) benzalactone or the substituted derivatives thereof. By selection of the substituents on the respective reactants, any desired styrylbenzopyrylium compound may be prepared.

In a typical example of the process, salicyl aldehyde and p-hydroxybenzalacetone in equimolar proportions are dissolved in a suitable solvent such as ethyl acetate or glacial acetic acid and the solution is saturated with HCl gas. The product, 2-(4-hydroxystyryl)-benzopyrylium chloride, is obtained in essentially quantitative yield. The process is illustrated by the following equation:

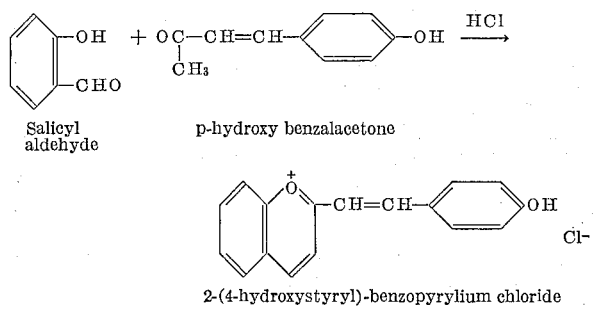

As noted above, by varying the substituents on the reactants, different styrylbenzopyrylium compounds may be produced. Typical of the range of variation are the following examples:

| Salicyl aldehyde condensed with— | Product (abbreviation "b.p.c." means benzopyrylium chloride) |
|---|---|
| p-Hydroxybenzalacetone | 2-(4-hydroxystyryl) b.p.c. |
| p-Methoxybenzalacetone | 2-(4-methoxystyryl) b.p.c. |
| 3-hydroxy-4-methoxybenzalacetone | 2-(3-hydroxy-4-methoxystyryl) b.p.c. |
| 4-hydroxy-3-methoxybenzalacetone | 2-(4-hydroxy-3-methoxystyryl) b.p.c. |
| 3,4-dihydroxybenzalacetone | 2-(3,4-dihydroxystyryl) b.p.c. |
| 3,4,5-trihydroxybenzalacetone | 2-(3,4,5-trihydroxystyryl) b.p.c. |
| 3,4,5-trimethoxybenzalacetone | 2-(3,4,5-trimethoxystyryl) b.p.c. |

Benzopyrylium compounds containing a hydroxyl group on the benzopyrylium nucleus are readily prepared, for example, by replacing salicyl aldehyde with β-resorcyl aldehyde. In a typical example of this procedure, β-resorcyl aldehyde and p-hydroxybenzalacetone in equimolar proportions are dissolved in a suitable solvent such as ethyl acetate, a glacial acetic acid, and the solution is saturated with hydrogen chloride gas. The product, 7-hydroxy-2-(4-hydroxystyryl) benzopyrylium chloride is formed in essentially quantitative yield. The process is illustrated by the following equation:

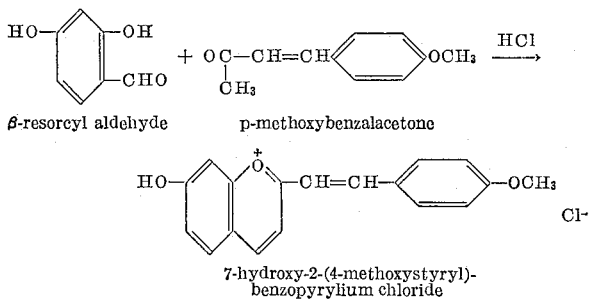

By varying the substituents on the reactants, different compounds may be produced. Typical of the range of variation are the following examples:

| β-Resorcyl aldehyde condensed with— | Product (abbreviation "b.p.c." means benzopyrylium chloride) |
|---|---|
| Benzalacetone | 7-hydroxy-2-styryl b.p.c. |
| p-Hydroxybenzalacetone | 7-hydroxy-2-(4-hydroxystyryl) b.p.c.* |
| p-Methoxybenzalacetone | 7-hydroxy-2-(4-methoxystyryl) b.p.c. |
| 3-hydroxy-4-methoxybenzalacetone | 7-hydroxy-2-(3-hydroxy-4-methoxystyryl) b.p.c. |
| 4-hydroxy-3-methoxybenzalacetone | 7-hydroxy-2-(4-hydroxy-3-methoxystyryl) b.p.c.* |
| 3,4-dihydroxybenzalacetone | 7-hydroxy-2-(3,4-dihydroxystyryl) b.p.c. |
| 3,4,5-trihydroxybenzalacetone | 7-hydroxy-2-(3,4,5-trihydroxystyryl) b.p.c. |
| 3,4,5-trimethoxybenzalacetone | 7-hydroxy-2-(3,4,5-trimethoxystyryl) b.p.c. |

*It is to be observed that the compounds (a) 7-hydroxy-2-(4-hydroxystyryl) benzopyrylium chloride and (b) 7-hydroxy-2-(4-hydroxy-3-methoxystyryl) benzopyrylium chloride are new compounds not heretofore known or described. They have the special advantage that they impart (a) typical strawberry or raspberry red colors or (b) typical grape (blue-red) colors, respectively, to food products such as fruit-flavored beverages and retain these colors for long periods of storage.

Other variations of the reactants in the condensation are exemplified by the following:

| | Product (abbreviation "b.p.c." means benzopyrylium chloride) |
|---|---|
| 5-methoxy salicyl aldehyde condensed with: | |
| p-Hydroxybenzalacetone | 6-methoxy-2-(4-hydroxystyryl) b.p.c. |
| 3-hydroxy-4-methoxybenzalacetone | 6-methoxy-2-(3-hydroxy-4-methoxystyryl) b.p.c. |
| 4-hydroxy-3-methoxybenzalacetone | 6-methoxy-2-(4-hydroxy-3-methoxystyryl) b.p.c. |
| 3,4-dihydroxybenzalacetone | 6-methoxy-2-(3,4-dihydroxystyryl) b.p.c. |
| 4-methoxy salicyl aldehyde condensed with: | |
| p-Hydroxybenzalacetone | 7-methoxy-2-(4-hydroxystyryl) b.p.c. |
| 3-hydroxy-4-methoxybenzalacetone | 7-methoxy-2-(3-hydroxy-4-methoxystyryl) b.p.c. |
| 4-hydroxy-3-methoxybenzalacetone | 7-methoxy-2-(4-hydroxy-3-methoxystyryl) b.p.c. |
| 3,4-dihydroxybenzalacetone | 7-methoxy-2-(3,4-dihydroxystyryl) b.p.c. |
| 3-methoxy salicyl aldehyde condensed with: | |
| p-Hydroxybenzalacetone | 8-methoxy-2-(4-hydroxystyryl) b.p.c. |
| 3-hydroxy-4-methoxybenzalacetone | 8-methoxy-2-(3-hydroxy-4-methoxystyryl) b.p.c. |
| 4-hydroxy-3-methoxybenzalacetone | 8-methoxy-2-(4-hydroxy-3-methoxystyryl) b.p.c. |
| 3,4-dihydroxybenzalacetone | 8-methoxy-2-(3,4-dihydroxystyryl) b.p.c. |

From a color standpoint, the compounds used in accordance with the invention provide red hues ranging in depth from orange-red through deep red to blue-red or purple. The particular color provided by any individual compound is largely determined by its content of hydroxyl or ether (e.g. methoxy) groups. Compounds having a paucity of such groups provide colors at the orange-red end of the spectrum (similar to strawberry red) while compounds of increasing numbers of hydroxyl and/or methoxyl groups display the more blue-red or purple or what may be termed burgundy or wine-red colors. It is obvious that in application of the compounds to color a particular food product, the selection of the compound to be used is simply a matter of the color desired in the product. The compounds are generally prepared and used in the form of their chloride salts. However, the particular anion (X in Formula III above) is not critical and may be derived from acids other than hydrochloric, for example, hydrobromic.

The application of the compounds of the invention in the coloring of food products is conducted as with prior coloring agents or food dyes. In situations where the food product is a liquid or is packed with a liquid component, such as a brine, syrup, or the like, the benzopyrylium compound is simply added to such liquid in the amount required to produce the desired coloration of the product. If the product is to be packed in solid form rather than with added liquid, then the product may be soaked in an aqueous solution of the benzopyrlyium compound until the desired color is attained, the product being then drained and packed in conventional manner. The amount of benzopyrylium compound required in any particular case will depend on the shade desired in the product. Since the benzopyrylium compounds have intense coloring action, only minute proportions thereof are required—on the order of 1 to 200 p.p.m. The compounds of the invention are useful for coloring all types of food materials which are in an acidic condition. Such condition is, of course, prevalent in most fruit and vegetable products since these contain natural acids such as citric, tartaric, malic, glycollic, etc. Also, many food products are deliberately acidified with such acids as citric, carbonic, phosphoric, tartaric, acetic, lactic, etc. The significance of the acid condition is that it is required to preserve the desired color of the compounds; at natural or alkaline pH's the compounds tend to undergo isomerization, leading to undesired color changes. Typical illustrative examples of foods which may be colored with the compounds of the invention are fruits; vegetables; juices, syrups, concentrates, or other liquid preparations made from fruits or vegetables; salad dressing; gelatin desserts, pickles and relishes; beverages such as carbonated or noncarbonated soft drinks, fruit ades, fruit-flavored drinks, wines, syrups, or bases for use in preparing carbonated or noncarbonated soft drinks. The compounds of the invention have the particular advantage that they are useful in situations where the substrate to be colored contains substances which cause decomposition of natural anthocyanin pigments or in situations where the substrate to be colored is subjected to processing or storage conditions which are conducive to decomposition of natural anthocyanin pigments. Typical of substances which adversely affect the color of natural anthocyanins are oxygen and ascorbic acid. The compounds of the invention can be successfully used with food products containing such agents without loss of color, even when stored for long periods of time. A special advantage of the compounds of the invention is that they can be used with food products such as fruit-flavored beverages (or bases for forming these) which contain ascorbic acid, added for vitamin supplementation or for its preservative effect. With such products the compounds of the invention provide colors which are stable for many months of storage and in this regard are more stable than conventional certified aniline coloring principles presently used in food and beverage production. In situations where the compounds of the invention are used to color food products containing ascorbic acid, best results are obtained if the products are kept out of contact with air. This is readily done, as well understood in the art, by packing the food product containing the added flavylium compound in a hermetically sealed container or by the use of such techniques as inert gas packaging, vacuum packaging, etc.

The invention is further demonstrated by the following examples:

EXAMPLE I 7-hydroxy-2-(4-hydroxystyryl)-benzopyrylium chloride

A mixture of 2,4-dihydroxybenzaldehyde (45 g.) and p-hydroxybenzalacetone (45 g.) in ethyl acetate (500 ml.) and alcohol (100 ml.) was saturated with a rapid stream of hydrogen chloride gas. After standing for 5 hours, ether (200 ml.) was added and the deeply-colored product (80 g.) was collected. It was purified by digestion in alcoholic HCl and recrystallized from aqueous citric acid solution by addition of concentrated hydrochloric acid.

The compound so prepared, 7-hydroxy-2-(4-hydroxystyryl)-benzopyrylium chloride, forms raspberry red solutions when dissolved in aqueous citric acid at concentrations of 5 to 100 p.p.m. Visually and spectrally, the compound $\lambda_{max}$ 507 m$\mu$ is similar to FD and C Red No. 1 ($\lambda_{max}$ 506 m$\mu$) and FD and C Red No. 4 ($\lambda_{max}$ 502 m$\mu$) and to natural pelargonidin-3-glucoside, the chief pigment of strawberry juice. The intensity of color of the compound is about three times that of the FD and C Red Nos. 1 and 4.

An aqueous solution was prepared containing 7-hydroxy-2-(4-hydroxystyryl)-benzopyrylium chloride (5 p.p.m.), sodium benzoate (0.1%), citric acid (0.4%) and sugar (10%). This solution had a raspberry red color and its absorbance was 0.530 at its $\lambda_{max}$ of 510 m$\mu$. On standing for 22 days exposed to bright sunlight its absorbance at 510 m$\mu$ was 0.230, indicating that the solution had retained 43.4% of its original color. In more concentrated solutions of the benzopyrylium compound, for example 100 p.p.m., the color loss on such standing is only barely perceptible to the eye.

EXAMPLE II 7-hydroxy-2-(3-methoxy-4-hydroxystyryl)-benzopyrylium chloride

HCl gas was passed into a solution of 2,4-dihydroxybenzaldehyde (57 g.) and vanillalacetone (57 g.) in ethyl acetate (500 ml.) and alcohol (100 ml.) until the solution was saturated. The solution was allowed to stand for 6 hours and the deep red-black crystals were separated, then purified by recrystallization from aqueous alcoholic HCl.

The compound so prepared, 7-hydroxy-2-(3-methoxy-4-hydroxystyryl)-benzopyrylium chloride, forms red-blue solutions when dissolved in aqueous citric acid at concentrations of 5–100 p.p.m. Spectrally, the compound ($\lambda_{max}$ 514 m$\mu$) is similar to FD and C Red No. 2 ($\lambda_{max}$ 520 m$\mu$). The intensity of color of the compound is about three times that of FD and C Red No. 2. Because of the bluish-red hue of the compound, which closely resembles that of natural grape pigments, it is eminently suitable for coloring such products as grape-flavored soft drinks and the like.

An aqueous solution was prepared containing 7-hydroxy-2-(3-methoxy-4 - hydroxystyryl) - benzopyrylium chloride (5 p.p.m.), sodium benzoate (0.1%), citric acid (0.4%), and sugar (10%). This solution had a blue-red color and its absorbance was 0.631 at its $\lambda_{max}$ of 520 m$\mu$. On standing for a week exposed to bright sunlight, its absorbance at 520 m$\mu$ was 0.345, indicating that the solution had retained 55% of its original color.

Having thus described the invention, what is claimed is:

1. A method for coloring a food selected from the group consisting of acidic fruit products and acidic vegetable products which comprises adding thereto a compound of the structure

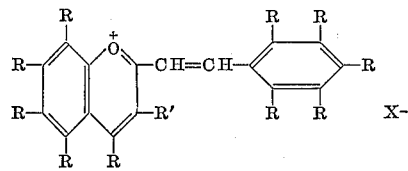

wherein each R represents a radical selected from the group consisting of hydrogen, hydroxyl, and lower alkoxy, wherein R' represents a radical selected from the group consisting of hydrogen, lower alkyl, phenyl, lower alkoxy, and phenoxy, and wherein X is an anion.

2. A composition comprising (1) a food selected from the group consisting of acidic fruit products and acidic vegetable products, and as a coloring agent (2) a compound of the structure as shown in claim 1.

3. The method of claim 1 wherein the food contains ascorbic acid.

4. The composition of claim 2 wherein the food contains ascorbic acid.

5. The method of claim 1 wherein the compound is 7-hydroxy - 2-(3-methoxy - 4-hydroxystyryl)-benzopyrylium chloride.

6. The composition of claim 2 wherein the coloring agent is 7-hydroxy-2-(3-methoxy-4-hydroxystyryl)-benzopyrylium chloride.

7. The method of claim 1 wherein the compound is 7-hydroxy-2-(4-hydroxystyryl)-benzopyrylium chloride.

8. The composition of claim 2 wherein the coloring agent is 7-hydroxy-2-(4-hydroxystyryl) - benzopyrylium chloride.

References Cited by the Examiner

UNITED STATES PATENTS

| | | | |
|---|---|---|---|
| 2,235,790 | 3/1941 | White | 260—210 |
| 2,336,890 | 12/1943 | Riegel et al. | 260—210 |
| 2,461,484 | 2/1949 | Thompson | 260—240 |
| 2,583,686 | 1/1952 | DeMent et al. | 99—148 X |
| 2,646,355 | 7/1953 | Zweifel et al. | 99—148 |
| 2,861,891 | 11/1958 | Bauernfeind | 99—148 |
| 2,943,943 | 7/1960 | Keller | 99—148 |

OTHER REFERENCES

Sinclair: The Orange, pages 303, 327–331, The University of California Printing Department, Riverside, California, (1961).

A. LOUIS MONACELL, *Primary Examiner.*

B. H. STRIZAK, D. DONOVAN, *Assistant Examiners.*